(12) United States Patent
Grutke et al.

(10) Patent No.: US 6,673,860 B1
(45) Date of Patent: Jan. 6, 2004

(54) THERMOPLASTIC NANOCOMPOSITES

(75) Inventors: Stefan Grutke, Neustadt (DE); Christof Mehler, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/869,705

(22) PCT Filed: Jul. 7, 2000

(86) PCT No.: PCT/EP00/00967
§ 371 (c)(1),
(2), (4) Date: Jul. 2, 2001

(87) PCT Pub. No.: WO00/47662
PCT Pub. Date: Aug. 17, 2000

(30) Foreign Application Priority Data

Feb. 10, 1999 (DE) .......................................... 199 05 503

(51) Int. Cl.[7] ................................................. C08K 3/34
(52) U.S. Cl. ........................ 524/445; 524/446; 524/447; 524/186
(58) Field of Search ................................. 524/445, 446, 524/447

(56) References Cited

U.S. PATENT DOCUMENTS

| | | | |
|---|---|---|---|
| 5,371,132 A | | 12/1994 | Ebara |
| 5,747,560 A | | 5/1998 | Christiani |
| 6,051,643 A | * | 4/2000 | Hasegawa et al. .......... 524/445 |
| 6,060,549 A | * | 5/2000 | Li et al. ..................... 524/445 |
| 6,136,908 A | * | 10/2000 | Liao et al. .................. 524/445 |
| 6,384,121 B1 | * | 5/2002 | Barbee et al. .............. 524/445 |
| 2002/0165306 A1 | * | 11/2002 | Gilmer et al. .............. 524/445 |

FOREIGN PATENT DOCUMENTS

WO 98/36022 8/1998

OTHER PUBLICATIONS

JP Derwent Abst. JP 6166780.

* cited by examiner

Primary Examiner—Edward J. Cain
Assistant Examiner—Katarzyna Wyrozebski Lee
(74) Attorney, Agent, or Firm—Keil & Weinkauf

(57) ABSTRACT

The invention relates to thermoplastic nanocomposites comprising
a) a thermoplastic (A), in which from 0.1 to 10% by weight of the monomer units present in component (A) bear ionic groups, and
b) at least one phyllosilicate (B), uniformly dispersed in component (A).

The invention further relates to a process for preparing these nanocomposites, and also to their use.

12 Claims, No Drawings

THERMOPLASTIC NANOCOMPOSITES

This application is a 371 of PCT/EP00/00967 filed Feb. 7, 2000.

The invention relates to thermoplastic nanocomposites with an advantageously balanced mechanical property profile.

Composite materials made from organic polymers, such as polyamides, and from phyllosilicates are known. These materials have high stiffness. However, while addition of the phyllosilicates improves stiffness, it reduces toughness.

It is usual for a stable mixture of the organic material with the inorganic material to be achieved by using an upstream step to modify the inorganic material.

WO 93/04117 relates to composite materials which have a polymer matrix and, dispersed therein, lamellar particles, preferably phyllosilicates. The particles are associated with onium compounds of the formulae

thus being hydrophobicized. The hydrophobicization step carried out is upstream of the mixing with the polymer.

DE-A 43 21 247 relates to polyamide resin compositions which comprise a polyamide component and an inorganic filler. Known silane coupling agents may be applied to the inorganic fillers in an upstream step in order to give stable mixing of the polyamide and the inorganic fillers.

It is an object of the present invention to provide thermoplastic nanocomposites with a balanced and advantageous mechanical property profile, dispensing with any modification of the inorganic material by way of an upstream step, such as hydrophobicization of the phyllosilicates used.

We have found that this object is achieved by way of thermoplastic nanocomposites comprising a) a thermoplastic (A), in which from 0.1 to 10% by weight of the monomer units present in component (A) bear ionic groups, and b) at least one phyllosilicate (B), uniformly dispersed in component (A).

The proportion of the monomer units present in component (A) which bear ionic groups is preferably from 2 to 8% by weight, particularly preferably from 4 to 6% by weight.

Injection moldings made from the thermoplastic nanocomposites of the invention have higher heat resistance, higher strength, and higher stiffness than those produced from known thermoplastic nanocomposites.

In comparison with glass-fiber-reinforced thermoplastics, an improvement is achieved in the surface of moldings produced from the thermoplastic nanocomposites, with comparable mechanical properties, with a lower filler content.

The thermoplastic nanocomposites of the invention preferably comprise a) from 30 to 99.99% by weight, preferably from 30 to 79% by weight, particularly preferably from 30 to 68% by weight, of component (A), b) from 0.01 to 20% by weight, preferably from 1 to 15% by weight, particularly preferably from 4 to 10% by weight, of component (B), c) from 0 to 50% by weight, preferably from 10 to 30% by weight, particularly preferably from 15 to 20% by weight, of other fillers (C), and d) from 0 to 50% by weight, preferably from 10 to 30% by weight, particularly preferably from 15 to 20% by weight, of other additives (D), where all of the components together give 100% by weight.

COMPONENT A

Thermoplastics

The thermoplastics are preferably those selected from polyamides, vinyl polymers, polyesters, polycarbonates, polyaldehydes and polyketones. Polyamides are particularly preferred.

Possible polyamide-forming monomers are lactams, such as ε-caprolactam, enantholactam, capryllolactam and laurolactam, and also mixtures of these, preferably ε-caprolactam. Examples of other polyamide-forming monomers which may be used are dicarboxylic acids, for example alkanedicarboxylic acids having from 6 to 12 carbon atoms, in particular from 6 to 10 carbon atoms, such as adipic acid, pimelic acid, suberic acid, azelaic acid or sebacic acid, or else terephthalic acid or isophthalic acid, diamines, for example $C_4$–$C_{12}$-alkyldiamines, in particular having from 4 to 8 carbon atoms, such as hexamethylenediamine, tetramethylenediamine, or octamethylenediamine, or else m-xylylenediamine, bis(4-aminophenyl)methane, 2,2-bis(4-aminophenyl)propane, or bis(4-aminocyclohexyl)methane, or else mixtures of dicarboxylic acids and diamines in any desired combination within each group, but preferably in an equivalent ratio each to the other, for example hexamethylenediammonium adipate, hexamethylenediammonium terephthalate or tetramethylenediammonium adipate, preferably hexamethylenediammonium adipate or hexamethylenediammonium terephthalate. Particular industrial importance is attached to polycaprolactam, to polyamides composed of hexamethylenediamine and adipic acid, to polyamides composed of ε-caprolactam, hexamethylenediamine, isophthalic acid and/or terephthalic acid, in particular nylon-6 (from ε-caprolactam) and nylon-6,6 (from hexamethylenediamine/adipic acid).

Monomers suitable for preparing vinyl polymers are ethylene, propylene, butadiene, isoprene, chloroprene, vinyl chloride, vinylidene chloride, vinyl fluoride, vinylidene fluoride, styrene, α-methylstyrene, divinylbenzene, acrylic acid, methyl acrylate, ethyl acrylate, n-propyl acrylate, isopropyl acrylate, n-butyl acrylate, isobutyl acrylate, tert-butyl acrylate, methacrylic acid, methyl methacrylate, ethyl methacrylate, n-propyl methacrylate, isopropyl methacrylate, n-butyl methacrylate, isobutyl methacrylate, tert-butyl methacrylate, acrylamide, methacrylamide, ethylacrylamide, n-propylacrylamide, isopropylacrylamide, acrylonitrile, vinyl alcohol, norbornadiene, N-vinylcarbazole, vinylpyridine, 1-butene, isobutene, vinylidene cyanide, 4-methyl-1-pentene vinyl acetate, vinyl isobutyl ether, methyl vinyl ketone, vinyl vinyl ketone, methyl vinyl ether, vinyl vinyl ether, vinyl vinyl sulfide, and acrolein. These monomers may be used alone or in combination with one another. Preferred vinyl polymers are polystyrene, in particular syndiotactic polystyrene, polyethylene, polypropylene, and polyvinyl chloride.

Polyesters are also suitable thermoplastics, preferably those based on terephthalic acid and diols, particularly preferably polyethylene terephthalate and polybutylene terephthalate.

Other suitable thermoplastics are polycarbonates, polyketones, and polyaldehydes, such as polyoxymethylene.

According to the invention, from 0.1 to 10% by weight, preferably from 2 to 8% by weight, particularly preferably from 4 to 6% by weight, of the monomer units present in component (A) bear ionic groups.

This achieves stable mixing of the inorganic material with the thermoplastic without any need for modification of the inorganic material in an upstream step.

Preferred ionic groups are anionic groups, such as carboxylates, sulfonates, and phosphates, as long as it is possible to prepare the appropriate monomers suitable for polymerization. The ionic groups in the monomer units are particularly preferably carboxylates or sulfonates. The sodium salt of sulfoisophthalic acid is very particularly preferred.

Examples of suitable appropriate monomers are tri- and tetracarboxylic acids, and also carboxylic dianhydrides, and salts of tri- or tetrasulfonic acids.

Examples of tricarboxylic acids are benzene-1,2,3-tricarboxylic acid, 2-methylbenzene-1,3,5-tricarboxylic acid, trimellitic acid (benzene-1,2,4-tricarboxylic acid), and cis,cis-1,3,5-trimethyl-cyclohexane-1,3,5-tricarboxylic acid.

Examples of tetracarboxylic acids are cyclopentane-1,2,3,4-tetracarboxylic acid, cyclobutane-1,2,3,4-tetracarboxylic acid, and 2,2-dimethylcyclo-butane-1,1,3,3-tetracarboxylic acid.

Examples of suitable carboxylic dianhydrides are pyromellitic dianhydride, naphthalene-1,4,5,8-tetracarboxylic dianhydride, and 3,3,4,4-biphenyltetracarboxylic dianhydride.

Examples of suitable salts of tri- or tetrasulfonic acids are the trisodium salt of naphthalene-1,3,6-trisulfonic acid, the trisodium salt of 8-tetradecyloxypyrene-1,3,6-trisulfonic acid, and the tetrasodium salt of pyrene-1,3,6,8-tetrasulfonic acid.

It is preferable to use carboxylic dianhydrides, and particular preference is given to pyromellitic dianhydride.

In the aqueous polymerization solution, the monomers mentioned are present in the form of their corresponding anions.

COMPONENT B

Phyllosilicates

Phyllosilicates are generally understood to be silicates in which the $SiO_4$ tetrahedra have been bonded in infinite two-dimensional networks. (The empirical formula for the anion is $(Si_2O_5^{2-}{}_n)$). The individual layers have bonding to one another via the cations lying between them, and the cations mostly present in the phyllosilicates which occur naturally are Na, K, Mg, Al and/or Ca.

Examples which should be mentioned of synthetic or naturally occurring phyllosilicates are montmorillonite, smectite, illite, sepiolite, palygorskite, muscovite, allevardite, amesite, hectorite, fluorohectorite, saponite, beidellite, talc, nontronite, stevensite, bentonite, mica, vermiculite, fluorovermiculite, halloysite, and fluorine-containing synthetic grades of talc. Particular preference is given to montmorillonite.

The layer thicknesses of the phyllosilicates are usually from 5 to 100 Å, very particularly preferably from 8 to 25 Å (distance from the upper boundary of one layer to the upper boundary of the next layer).

The distance between the layers here may then be increased by using polyamide monomers to convert (swell) the phyllosilicates, e.g. at from 25 to 300° C., preferably from 80 to 280° C., and in particular from 80 to 260° C., using a residence time which is generally from 5 to 120 min, preferably from 10 to 60 min. Depending on the length of the residence time and the nature of the monomer selected, the distance between the layers becomes enlarged by from 10 to 150 Å, preferably by from 10 to 50 Å. The length of the lamellae is usually up to 2,000 Å, preferably up to 1,500 Å. Any prepolymers present or formed generally also contribute to the swelling of the phyllosilicates.

COMPONENT C

Fillers

Suitable fillers are particulate or fibrous fillers. Suitable particulate fillers are carbonates, such as magnesium carbonate or chalk. Preference is given to the use of fibrous fillers. Examples of suitable fibrous fillers are carbon fibers, potassium titanate whiskers, aramid fibers, and glass fibers. It is particularly preferable to use glass fibers. If glass fibers are used, these may have been provided with a size and with a coupling agent to improve compatibility with the matrix material. The diameter of the carbon fibers or glass fibers used is generally in the range from 6 to 16 μm. The glass fibers incorporated may either be in the form of short glass fibers or else in the form of continuous-filament fibers (rovings). Carbon fibers or glass fibers may also be used in the form of wovens, mats, or glass silk rovings.

COMPONENT (D)

Additives

The compositions may also comprise additives. Examples of these additives are processing aids, stabilizers, and oxidation retarders, heat stabilizers, UV stabilizers, lubricants, mold-release agents, flame retardants, dyes, pigments, and plasticizers.

The amounts generally present of pigments and dyes are from 0 to 4% by weight, preferably from 0.5 to 3.5% by weight, and particularly preferably from 0.5 to 3% by weight, based on the total weight of the compositions.

The pigments for coloration of thermoplastics are well known, see for example R. Gächter and H. Müller, Taschenbuch der Kunststoffadditive, Carl Hanser Verlag, 1983, pp. 494 to 510. A first preferred group of pigments which should be mentioned is that of white pigments, such as zinc oxide, zinc sulfide, white lead (2 $PbCO_3 \cdot Pb(OH)_2$), lithopones, antimony white, and titanium dioxide. Of the two commonest crystalline forms of titanium dioxide (rutile and anatase), it is particularly the rutile form which is used for white coloration of the thermoplastic nanocomposites of the invention.

Black pigments which may be used according to the invention are iron oxide black ($Fe_3O_4$), spinel black ($Cu(Cr,Fe)_2O_4$), manganese black (a mixture of manganese dioxide, silicon dioxide, and iron oxide), cobalt black and antimony black, and also particularly preferably carbon black, the forms mostly used being furnace black and gas black (in this connection see G. Benzing, Pigmente für Anstrichmittel, Expert-Verlag (1988), pp. 78 et seq.).

According to the invention it is, of course, possible to set particular shades of color by using inorganic color pigments, such as chromium oxide green, or organic color pigments, such as azo pigments or phthalocyanines. Pigments of this type are generally commercially available.

It can also be advantageous to use a mixture of the pigments or dyes mentioned, e.g. carbon black with copper phthalocyanines, since this generally makes it easier to disperse the color in the thermoplastic.

Examples of oxidation retarders and heat stabilizers which according to the invention may be added to the thermoplastic materials are halides of metals of group I of the Periodic Table, e.g. sodium halides, potassium halides, and lithium halides, where appropriate combined with copper(I) halides, e.g. chlorides, bromides, or iodides. The halides, in particular of copper, may also contain electron-rich π-ligands. Examples which may be mentioned of copper complexes of this type are Cu-halide complexes with, for example, triphenylphosphine. It is also possible to use zinc fluoride and zinc chloride. Use may moreover be made of sterically hindered phenols, hydroquinones, substituted members of this group, secondary aromatic amines, where appropriate combined with phosphorus-containing acids or, respectively, with salts of these, or mixtures of these compounds, generally in concentrations of up to 1% by weight, based on the weight of the mixture.

Examples of UV stabilizers are various substituted resorcinols, salicylates, benzotriazoles, and benzophenones, usually used in amounts of up to 2% by weight.

Lubricants and mold-release agents, which are usually used in amounts of up to 1% by weight of the thermoplastic material, are stearic acid, stearyl alcohol, alkyl stearates and stearamides, and also esters of pentaerythritol with long-chain fatty acids. Stearates of calcium, of zinc, or of aluminum, or else dialkyl ketones, e.g. distearyl ketone, may also be used.

PROCESS FOR PREPARING THE THERMOPLASTIC NANOCOMPOSITES OF THE INVENTION

There are various ways of preparing the thermoplastic nanocomposites of the invention.

1. In-situ Method

In the in-situ method, the phyllosilicate (B) is mixed, in suspension or as a solid, with the monomers polymerizable to give the thermoplastic (A), from 0.1 to 10% by weight of the monomers bearing ionic groups. Swelling of the phyllosilicate by the monomers then takes place. The polymerization of the monomers which follows may be carried out in a usual manner. The resultant nanocomposites are then compounded, where appropriate, with the other components (C) and (D).

For the purposes of the present invention, compounding is the mixing of the components of which the nanocomposites are composed, for example in an extruder, to give the finished nanocomposite.

For this, the hydrophobicized phyllosilicates (B) are suspended in liquid monomers polymerizable to give component (A) (thermoplastics) and polymerized in the presence of generally from 0.1 to 8% by weight, preferably from 0.1 to 7% by weight, of water, based on the monomers. The polymerization is preferably carried out in the presence of more than 0.2% by weight of water, for example from 0.25 to 6% by weight of water.

The water may be added to the suspension. If these suspensions already comprise water, either no further water is added or the amount of water added is only that needed so that the total amount of water, based on the monomers, is within the range according to the invention.

To achieve very good and thorough mixing, the suspension is advantageously stirred, particularly preferably with high shear. Stirred tank reactors, for example, are suitable for this purpose. The water is then generally added all at once, little by little, or continuously, while the temperature of the suspension is generally from 70 to 100° C., preferably from 75 to 95° C. The temperature of the aqueous suspension is increased, either at the same time or subsequently, generally as far as from 180 to 330° C., preferably from 220 to 320° C. The suspension may either remain in the apparatus in which it has been prepared, or may be transferred into another reaction vessel, prior to or after the temperature increase, or prior to or after the addition of water. It is particularly advantageous to carry out the polymerization with simultaneous application of shear.

A variety of methods may be used for conducting the process to prepare the compositions of the invention. For example, they may be prepared by a batch process or a continuous process.

In the batch process, the aqueous suspension may be polymerized under the abovementioned conditions of temperature and shear, and under pressure. The pressure here is generally from 5 to 30 bar, preferably from 8 to 20 bar (absolute). The residence times here are substantially dependent on the temperature selected during the polymerization and are generally from 0.5 to 3 h. After equilibrium conversion has been reached, the water is generally evaporated and the pressure reduced to atmospheric pressure. Any water still present in the melt can cause further molecular weight increase, even at this pressure. The reaction mixture is then discharged, for example as shaped strips of melt, cooled, advantageously by passing through a water bath, and comminuted, preferably pelletized. The resultant polyamides generally have molar masses of up to 22,000 g/mol, preferably from 8,000 to 22,000 g/mol.

In one preferred embodiment, the continuous process is generally carried out by feeding the aqueous suspension, whose temperature is from 70 to 100° C., preferably from 75 to 95° C., continuously to a first reaction zone and polymerizing the same there under the abovementioned conditions of temperature and shear. In one particularly preferred embodiment, prepolymers of other monomers, or of the same monomers, may be fed, alongside the aqueous suspension, to the first reaction zone. These may derive from the extraction of pelletized product (see below), for example. The pressure in the first reaction zone is generally below 5 bar (absolute), for example from 1 to 3 bar (absolute).

The residence time, which substantially depends on the temperature, pressure, and water content of the reaction mixture, is generally selected to be from 2 to 5 h, preferably from 3 to 4 h. If prepolymers are fed into the first stage of the reaction, the residence times are generally below 2 h, preferably from 0.5 to 1 h. When caprolactam is used, polycondensation in the first reaction zone is usually to a molar mass of 3,000 g/mol or above, preferably from 5,000 to 7,000 g/mol. Examples of the total end group concentration here are from 200 to 600 mmol/kg, preferably from 300 to 400 mmol/kg.

The reaction mixture is passed from the first reaction zone into a second reaction zone. The reaction vessel of the second reaction zone may, for example, be tube-shaped, and it is preferably equipped with internals. These include ordered mixing elements, such as packings (e.g. Raschig rings, beads or Pall rings) so as preferably to ensure a minimum period of residence of the as yet unreacted monomers in the melt (in order to achieve a high degree of conversion) and to avoid to a very substantial extent the presence of any zones in which no, or only minimal, transport of the melt takes place ("dead zones"), and also to avoid any back-mixing. The temperatures in the second reaction zone are generally within the same range as those in the first reaction zone. The residence time in the second reaction zone may vary within wide limits, depending on the type of monomer, the temperature, the pressure, and the nature of the reaction vessel. The residence time in the second reaction zone is generally longer if no prepolymer has been added in the first reaction zone. The polymer melt is generally discharged from the second reaction zone in the form of shaped strands of melt, cooled using a water bath, and comminuted, preferably pelletized. Examples of molar masses of polyamides obtained in this way are from 12,000 to 22,000 g/mol.

The compositions obtained from the batch process, and those obtained from the continuous process, may also comprise volatile constituents, such as the lactam used (for example in caprolactam polymerization), and other monomer units, and also steam-volatile oligomers. These are generally removed from the polymer granules by counter-current extraction with water (see, for example, DD-A 206999). Another way to do this is gas-phase extraction (see EP-A 0 284 968) with simultaneous molecular weight increase, and superheated steam may be used to give simultaneous extraction and annealing in this extraction process. In one preferred embodiment, the volatile constituents are reintroduced quantitatively into the process, i.e. preferably into the first reaction zone. To this end, the concentration in the extraction water is preferably increased to an extract content of not more than 85% by weight, and the water content of the concentrate obtained is adjusted by adding fresh monomers in such a way that the polycondensation can be carried out in the presence of the amount of water according to the invention. If the polymerization is carried out in this way, at least one adiabatic release of pressure is generally brought about during the polymerization in order to reduce the water content (see De-A-19 752 181).

The desired viscosity number of the final product may also be adjusted in a known manner by drying, or by polymerization during annealing in the solid phase.

The desired viscosity number of the final product here is generally in the range from 80 to 350 ml/g, preferably from 120 to 200 ml/g (measured on a 0.5% strength by weight solution in 95% strength by weight sulfuric acid, after removal of the insoluble constituents).

Where appropriate, usual methods are used to compound the resultant nanocomposites with other components (C) and (D), for example by compounding in an extruder.

2. Melt Intercalation

In another preferred embodiment, the thermoplastic nanocomposites of the invention may be obtained by mixing the thermoplastic (component A) having ionic groups with the phyllosilicate (component B), and also, where appropriate, components (C) and (D) by well-known processes, e.g. using extrusion at from 160 to 320° C., particularly preferably at from 240 to 300° C. A high-shear twin-screw extruder is particularly suitable for this, preferred shear stresses to DIN 11 443 being from 10 to $10^5$ Pa, in particular from $10^2$ to $10^4$ Pa.

The resultant thermoplastic nanocomposites of the invention have, in particular, excellent toughness together with very good stiffness. They can be used to produce moldings, preferably by extrusion, thermoforming, or injection molding.

The present invention therefore also provides moldings obtainable using the nanocomposites of the invention.

The examples below give further description of the invention.

EXAMPLES

Example 1

Preparation of a nylon-6 (polycaprolactam) with 5% by weight of pyromellitic dianhydride (1,2,4,5-benzene-tetracarboxylic dianhydride)/hexamethylenediamine (HMD) in the presence of dust-free bentonite. The polymerization of caprolactam was carried out in the presence of 5% by weight of pyromellitic dianhydride/HMD. The polycondensation was carried out under conventional conditions.

Example 2

Preparation of a nylon-6 with 5% by weight of pyromellitic dianhydride/HMD followed by compounding with dust-free bentonite. The preparation of A took place as in example 1. All of the starting materials then compounded using a ZSK 40 at 275° C. under conventional conditions.

Example 3

Preparation of a nylon-6,6 from (adipic acid/hexamethylenediamine) with 3% by weight of the sodium salt of sulfoisophthalic acid/HMD, followed by compounding with dust-free bentonite. The polymerization of AH salt (hexamethylenediammonium adipate) was carried out in the presence of 5% by weight of pyromellitic dianhydride/HMD.

Comparative Example 1

Preparation of a polyamide in the presence of dust-free bentonite as in example 1.

Comparative Example 2

Preparation of a nylon-6 followed by compounding with dust-free bentonite as in example 2.

Comparative Example 3

Preparation of a nylon-6,6 in the presence of hydrophobicized bentonite.

PERFORMANCE TESTING

The viscosity number of the matrix was determined on 0.5% strength by weight solutions in sulfuric acid at 23° C.

The heat deflection temperature (HDT) is determined to ISO 75 (dry).

Melt index (MVI) was determined at 275° C. under a load of 5 kg.

Charpy impact strengths ($a_n$[kJ/m$^2$]) were measured on ISO specimens without notches, to ISO 179 Part I.

The tensile test was carried out to ISO 527-2.

The results of performance testing are given in table 1.

TABLE 1

| Property | Unit | Test specification | Example 1 | Example 2 | Example 3 | 1 c | 2 c | 3 c |
|---|---|---|---|---|---|---|---|---|
| Viscosity number of matrix | Ml/g | | 140 | 145 | 143 | 142 | 141 | 145 |
| Content of mineral | % by weight | after ashing | 5.0 | 4.9 | 4.9 | 5.1 | 4.8 | 5.0 |
| HDT/A | °C. | | 128 | 125 | 124 | 98 | 80 | 92 |
| Tensile modulus of elasticity | MPa | ISO 527-2 | 5820 | 5590 | 5710 | 4610 | 4400 | 4690 |
| Elongation at break | % | ISO 527-2 | 2.3 | 2.5 | 2.4 | 2.5 | 3.2 | 2.6 |
| Breaking strength | MPa | ISO 527-2 | 103 | 98 | 107 | 72 | 54 | 75 |
| Melt index 275/5 | g/10 min | ISO 1133 | 65 | 69 | 62 | 81 | 92 | 78 |
| Charpy impact strength 1 eU | KJ/m$^2$ | ISO 179/1 eU | 59 | 63 | 54 | 60 | 62 | 55 |

We claim:

1. A thermoplastic nanocomposite comprising
   a) a polyamide (A) having a molar mass from 8,000 to 22,000 g/mol in which from 2 to 8% by weight of the monomer units present in component (A) bear anionic groups, and
   b) at least one phyllosilicate (B), uniformly dispersed in component (A).

2. A thermoplastic nanocomposite as claimed in claim 1, comprising
   a) from 30 to 99.99% by weight of component (A),
   b) from 0.01 to 20% by weight of component (B),
   c) from 0 to 50% by weight of other fillers (C), and
   d) from 0 to 50% by weight of other additives (D),
   where all of the components together give 100% by weight.

3. A thermoplastic nanocomposite as claimed in claim 2, comprising
   a) from 30 to 79% by weight of component (A),
   b) from 1 to 12% by weight of component (B),
   c) from 10 to 30% by weight of other fillers (C), and
   d) from 10 to 30% by weight of other additives (D),
   where all of the components together give 100% by weight.

4. A thermoplastic nanocomposite as claimed in claim 1, wherein the anionic group in the monomer units have been selected form carboxylates and sulfonates.

5. A process for preparing a thermoplastic nanocomposite as claimed in claim 1 by an in-situ method in which the phyllosilicate (B) in suspension or as a solid is mixed with the monomers polymerizable to give the polyamide (A), swelling of the phyllosilicate by the monomers takes place, and then polymerization of the monomers is carried out and the resultant nanocomposites are, optionally compounded with components (C) and/or (D).

6. A process for preparing a thermoplastic nanocomposite as claimed in claim 1 by melt intercalation, where the polyamide (component A), the phyllosilicate (component B), and also, where optionally, components (C) and (D) are mixed at from 160 to 320° C.

7. A molding obtainable using thermoplastic nanocomposites as claimed in claim 1.

8. A process for producing a molding, as claimed in claim 7, by extrusion, thermoforming or injection molding.

9. A thermoplastic nanocomposite as claimed in claim 1 wherein from 4 to 6% by weight of the monomeric units present in component (A) bear anionic groups.

10. A thermoplastic nanocomposite comprising
    a) from 30 to 99.99% by weight of a polyamide (A), in which from 2 to 8% by weight of the monomer units present in component (A) bear anionic groups, and
    b) from 0.01 to 20% by weight of at least one phyllosilicate (B), uniformly dispersed in component (A), from 0 to 50% by weight of other fillers (C) and from 0 to 50% by weigh to other additives (D), obtainable by an in-situ method in which the phyllosilicate (B) in suspension or as a solid is mixed with the monomers polymerizable to give the polyamide (A), swelling of the phyllosilicate by the monomers takes place, and then polymerization of the monomers is carried out and the resultant nanocomposites are, optionally compounded with components (C) and/or (D).

11. A thermoplastic nanocomposite as claimed in claim 10, wherein the anionic groups in the monomer units have been selected form carboxylates and sulfonates.

12. A molding obtainable using thermoplastic nanocomposites as claimed in claim 10.

* * * * *

UNITED STATES PATENT AND TRADEMARK OFFICE
CERTIFICATE OF CORRECTION

PATENT NO. : 6,673,860 B1
DATED : January 6, 2004
INVENTOR(S) : Grutke et al.

It is certified that error appears in the above-identified patent and that said Letters Patent is hereby corrected as shown below:

<u>Title page,</u>
Item [22], "Jul. 7, 2000" should be -- Feb. 7, 2000 --.

<u>Column 10,</u>
Line 38, "weigh" should be -- weight --.

Signed and Sealed this

Twenty-seventh Day of April, 2004

JON W. DUDAS
*Acting Director of the United States Patent and Trademark Office*